(12) United States Patent
Stricker et al.

(10) Patent No.: US 11,184,485 B1
(45) Date of Patent: *Nov. 23, 2021

(54) PANEL CONTROL OVER BROADBAND

(71) Applicant: Vivint, Inc., Provo, UT (US)

(72) Inventors: Jimmy Stricker, Herriman, UT (US);
John Vogelsberg, West Jordan, UT (US); Craig Matsuura, Draper, UT (US); Ryan Carlson, South Jordan, UT (US); Michael Allen Tupy, Farmington, MN (US)

(73) Assignee: Vivint, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/362,523

(22) Filed: Mar. 22, 2019

Related U.S. Application Data

(63) Continuation of application No. 15/216,534, filed on Jul. 21, 2016, now Pat. No. 10,244,122.

(51) Int. Cl.
| | | |
|---|---|---|
| *H04L 29/06* | (2006.01) | |
| *H04M 11/00* | (2006.01) | |
| *H04M 11/04* | (2006.01) | |
| *G08B 25/00* | (2006.01) | |
| *H04M 7/00* | (2006.01) | |
| *G08B 25/08* | (2006.01) | |
| *H04M 1/27* | (2006.01) | |
| *H04W 84/04* | (2009.01) | |

(52) U.S. Cl.
CPC ........... *H04M 11/007* (2013.01); *G08B 25/00* (2013.01); *G08B 25/007* (2013.01); *G08B 25/009* (2013.01); *G08B 25/08* (2013.01); *H04L 63/04* (2013.01); *H04L 65/1069* (2013.01); *H04M 1/27* (2013.01); *H04M 7/006* (2013.01); *H04M 11/04* (2013.01); *H04L 65/00* (2013.01); *H04W 84/042* (2013.01)

(58) Field of Classification Search
CPC ........ G08B 21/02; G08B 21/22; G08B 25/08; G08B 3/10; H04B 7/18528; H04B 7/18571; H04B 7/18576; H04W 84/06
USPC ......................................................... 370/328
See application file for complete search history.

(56) References Cited

U.S. PATENT DOCUMENTS

| | | | |
|---|---|---|---|
| 7,734,020 B2 | 6/2010 | Elliot et al. | |
| 8,223,201 B2 | 7/2012 | Desai et al. | |
| 8,520,068 B2 | 8/2013 | Naidoo et al. | |
| 9,318,005 B2* | 4/2016 | Hicks, III | ............ G08B 25/004 |
| 2004/0086093 A1 | 5/2004 | Schranz | |
| 2006/0064505 A1* | 3/2006 | Lee | ...................... G08B 25/008 |
| | | | 709/238 |
| 2006/0239250 A1* | 10/2006 | Elliot | ...................... H04M 3/08 |
| | | | 370/352 |

(Continued)

*Primary Examiner* — Robert J Lopata
(74) *Attorney, Agent, or Firm* — Holland & Hart, LLP

(57) ABSTRACT

Systems and methods for communicating between components of a security and/or automation system include establishing a two-way call between a control panel and a central station of the security and/or automation system using a Voice over Internet Protocol (VoIP) channel connection, and after establishing the two-way call, communicating data between the central station and the control panel via a central station of the security and/or automation system via a second connection different from the VoIP channel connection, the data being related to control of the control panel.

13 Claims, 12 Drawing Sheets

(56) References Cited

U.S. PATENT DOCUMENTS

| | | | | |
|---|---|---|---|---|
| 2007/0201625 A1* | 8/2007 | Martin | | H04M 3/436 |
| | | | | 379/45 |
| 2008/0212746 A1* | 9/2008 | Gupta | | G06F 19/3418 |
| | | | | 379/38 |
| 2009/0058630 A1* | 3/2009 | Friar | | G08B 25/08 |
| | | | | 340/506 |
| 2009/0323904 A1* | 12/2009 | Shapiro | | G08B 25/08 |
| | | | | 379/39 |
| 2010/0097210 A1* | 4/2010 | Tyroler | | G01D 21/00 |
| | | | | 340/540 |
| 2011/0032095 A1* | 2/2011 | Hicks, III | | G08B 25/004 |
| | | | | 340/516 |
| 2011/0090334 A1* | 4/2011 | Hicks, III | | G08B 13/19656 |
| | | | | 348/143 |
| 2011/0169628 A1* | 7/2011 | Elliot | | H04L 12/40013 |
| | | | | 340/506 |
| 2011/0298616 A1* | 12/2011 | Foisy | | G08B 29/06 |
| | | | | 340/540 |
| 2012/0076009 A1* | 3/2012 | Pasko | | H04W 28/20 |
| | | | | 370/252 |
| 2012/0122418 A1* | 5/2012 | Hicks, III | | G08B 25/001 |
| | | | | 455/404.1 |
| 2012/0297406 A1* | 11/2012 | Bartholomay | | G06Q 30/0241 |
| | | | | 725/9 |
| 2013/0002424 A1* | 1/2013 | Haynes | | G08B 5/36 |
| | | | | 340/540 |
| 2013/0027197 A1* | 1/2013 | Foisy | | G08B 13/1672 |
| | | | | 340/506 |
| 2013/0120131 A1* | 5/2013 | Hicks, III | | H04L 69/14 |
| | | | | 340/501 |
| 2013/0120132 A1* | 5/2013 | Hicks, III | | H04W 4/90 |
| | | | | 340/501 |
| 2013/0120133 A1* | 5/2013 | Hicks, III | | G08B 25/004 |
| | | | | 340/501 |
| 2013/0120134 A1* | 5/2013 | Hicks, III | | G08B 25/004 |
| | | | | 340/501 |
| 2013/0120138 A1* | 5/2013 | Hicks, III | | G08B 13/19656 |
| | | | | 340/538 |
| 2013/0121239 A1* | 5/2013 | Hicks, III | | H04W 4/12 |
| | | | | 370/328 |
| 2013/0189946 A1* | 7/2013 | Swanson | | H04W 64/006 |
| | | | | 455/404.2 |
| 2014/0035741 A1* | 2/2014 | Morehead | | G08B 27/00 |
| | | | | 340/501 |
| 2014/0036732 A1* | 2/2014 | Elliot | | H04L 12/40013 |
| | | | | 370/259 |
| 2014/0092796 A1* | 4/2014 | Gregory | | H04M 11/04 |
| | | | | 370/310 |
| 2015/0163651 A1* | 6/2015 | Tuck | | H04W 4/90 |
| | | | | 370/259 |
| 2017/0132890 A1* | 5/2017 | Hicks, III | | H04L 69/14 |
| 2019/0266880 A1* | 8/2019 | Martin | | G08B 25/004 |

* cited by examiner

PANEL CONTROL OVER BROADBAND

CROSS-REFERENCE TO RELATED APPLICATION

The present application is a continuation of U.S. patent application Ser. No. 15/216,534, filed Jul. 21, 2016, titled "PANEL CONTROL OVER BROADBAND," and assigned to the assignee hereof, the disclosure of which is incorporated herein in its entirety by this reference.

BACKGROUND

The present disclosure, for example, relates to security and/or automation systems, and more particularly to controlling a control panel remotely, such as from a central station of a security and/or automation system, particularly while conducting a two-way call over a common data channel.

Security and automation systems are widely deployed to provide various types of communication and functional features such as monitoring, communication, notification, and/or others. These systems may be capable of supporting communication with a user through a communication connection or a system management action.

Traditionally, communications between a controller (e.g., control panel) of the security and/or automation systems and a central station are conducted over a two-way voice call (e.g., land line or cellular call). This restricts the control panel to only communicating on a voice call during the two-way session. The voice call is limited in quality to the audio properties in the equipment used by the control panel, the phone company, and the central station. The controls are limited to just telephone keypad touchtones (dual-tone multi-frequency—DTMF) such as hitting 1 to talk and 3 to listen. When a poor connection exists, the touchtones are not audibly "heard" by the panel and make it difficult for the operator to control the call. Additionally caller ID (CID) signals are held by the panel until after the two-way call is terminated causing questions by operators who have to make assumptions about how to handle those signals when they come in. Additionally, cellular air time is possibly more costly than the cell data exchanged for a call of the same length when using DTMF calls over a cellular network.

SUMMARY

The present disclosure relates to communications between control panels, backend servers, and central stations of security and/or automation systems. In particular, the present disclosure relates to conducting two-way calls between the control panel and central station of a security and/or automation system using a Voice over Internet Protocol (VoIP) channel connection. The present disclosure also relates to transferring data concurrently with the ongoing two-way call using a connection different from the VoIP channel connection. The data may include commands from the central station that are sent to the control panel, such as commands for controlling the control panel. The VoIP channel connection may facilitate the data transfer while concurrently conducting the two-way call.

In one embodiment, a method for communicating between components of a security and/or automation system is disclosed. The method includes establishing a two-way call between a control panel and a central station of the security and/or automation system using a Voice over Internet Protocol (VoIP) channel connection, and after establishing the two-way call, communicating data between the central station and the control panel via a central station of the security and/or automation system via a second connection different from the VoIP channel, the data being related to control of the control panel.

In one example, communicating data includes communicating data between the central station and the control panel via a backend server of the security and/or automation system. The method may include identifying a trigger event, and transmitting information about the trigger event to a backend server of the security and/or automation system via the second connection. The trigger event may be an alarm condition identified by the control panel. The method may include identifying a two-way call number stored at the control panel for use in establishing the two-way call. The VoIP channel connection may be available on a cellular network. The method may include delivering a request from the central station to the control panel for the control panel to initiate the two-way call.

In another embodiment, an apparatus for communicating between components of a security and/or automation system is disclosed. The apparatus includes a processor, memory in electronic communication with the processor, and instructions stored in the memory. The instructions are executable by the processor to establish a two-way call between a control panel and a central station of the security and/or automation system using a Voice over Internet Protocol (VoIP) channel connection, and while the two-way call is ongoing, communicate data over another connection associated with the VoIP channel connection for control of the control panel.

In one example, communicating data may include communicating data between the central station and the control panel via a backend server of the security and/or automation system. The instructions may be further executable by the processor to identify a trigger event, and transmit information about the trigger event to a backend server of the security and/or automation system via the another connection. The trigger event may be an alarm condition identified by the control panel. The instructions may be further executable by the processor to identify a two-way call number stored at the control panel for use in establishing the two-way call. The VoIP channel connection may be available on a cellular network.

A further embodiment is directed to a method for communicating between components of a security and/or automation system. The method includes identifying a trigger event, transmitting information about the trigger event to a backend server of the security and/or automation system via a connection different from a Voice over Internet Protocol (VoIP) channel connection, and establishing a two-way call directly with a central station of the security and/or automation system over the VoIP channel connection using a stored two-way call number.

In one example, the trigger event may include a request from the central station to establish the two-way call. The method may include communicating data over the connection different from the VoIP channel connection during the two-way call. The data may be routed through the backend server to the central station. The trigger event may include a detected alarm condition at a property being monitored by the security and/or automation system. The trigger event may be identified by a control panel of the security and/or automation system, and the information about the trigger event may be transmitted from the control panel to the backend server via the connection different from the VoIP channel connection. The method may include delivering a caller ID to the central station as part of establishing the two-way call.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
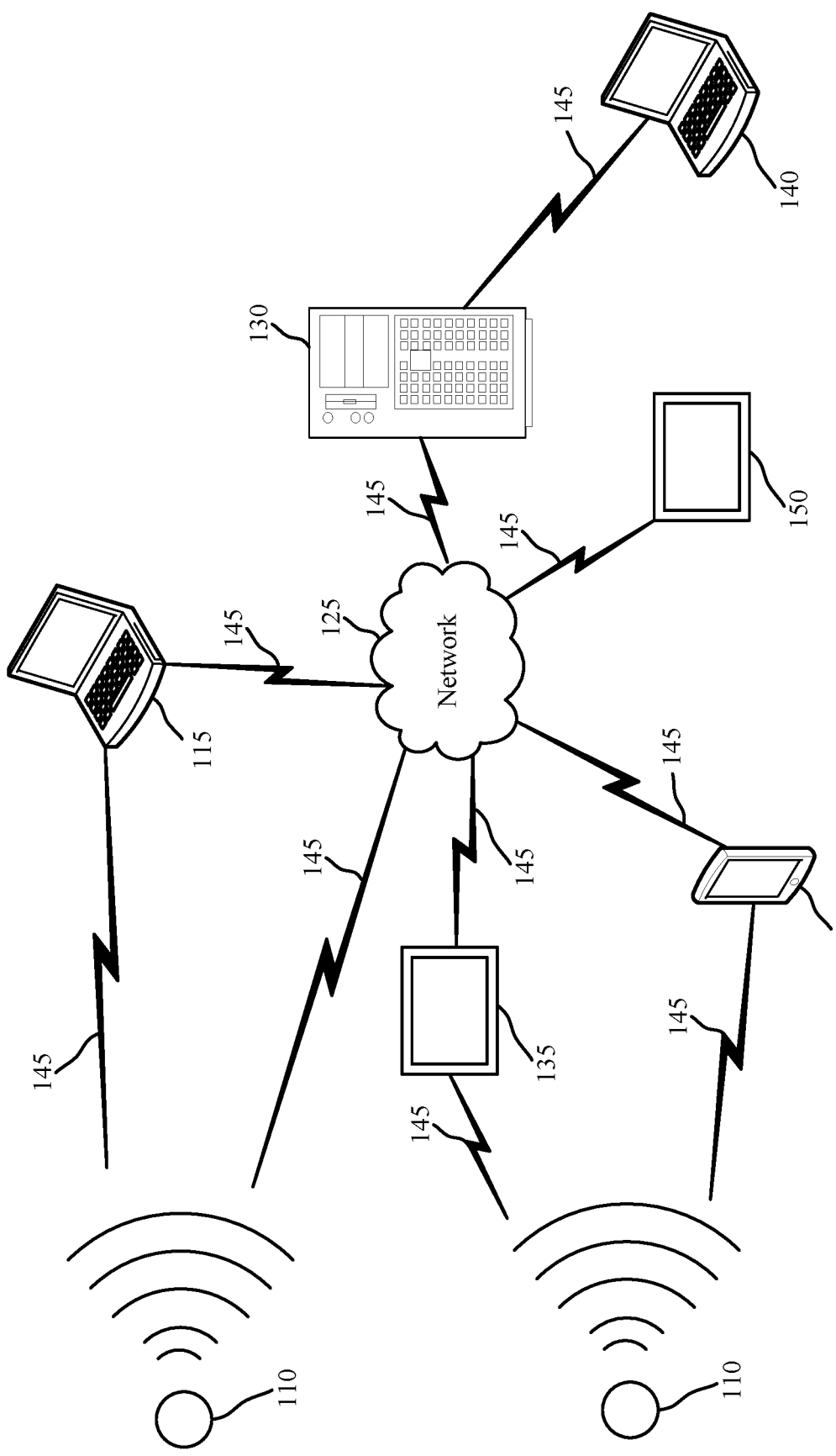
FIG. 1 is a block diagram of an example of a security and/or automation system in accordance with various embodiments.

The following relates generally to communications between components of a security and/or automation system (e.g., a control panel, a backend server, and a central station). Traditionally, communications between the control panel and central station are conducted over a two-way voice call (e.g., land line or cellular call). During the two-way call, no other communications between the control panel and other components such as the central station and backend server are possible. Thus, the control panel is limited to communicating via only the voice call during the two-way session. The present disclosure is directed to using a broadband connection for two-way calls between the control panel and the central station of a home automation system. Many types of broadband connections may be used. In one example, the control panel defaults to using a Voice over Internet Protocol (VoIP) call when a two-way call with the central station is needed. The VoIP call can be made over a broadband cellular data connection. When using a broadband connection for communications between the control panel and central station, other communications and/or data transmission may occur during the two-way call. For example, the central station may be able to view cameras, perform panel controls, operate components of the home automation system, arm/disarm a security feature of the home automation system, etc. via a second connection over the broadband medium while the two-way call is ongoing. In some examples, this second connection may include one or more video channels, data channels, command channels, other channels, or some combination.

One aspect of the present disclosure relates to identifying a triggering event and establishing two-way calls between a control panel and a central station of a security and/or automation system in response to the triggering event. The two-way call may be conducted over a Voice over Internet Protocol (VoIP) channel connection. The VoIP channel connection may be provided over a broadband connection. Various types of broadband connections are available including, for example, coaxial cable, optical fiber, twisted pair, digital subscriber line (DSL), local telephone networks, cellular networks, and wireless broadband. The control panel, central station, and backend server, which typically all communicate with each other, may each have VoIP hardware that facilitate VoIP communications there between.

The two-way call may be prompted by an alarm condition at a property being monitored by the security and/or automation system. For example, the control panel may receive sensor data from one or more sensors located at the property that indicate an alarm condition via channel connection different from the VoIP channel connection. The alarm condition may be referred to as a trigger event and may be one example of various types of trigger events that may prompt the initiation of the two-way call. The data collected by the control panel may be delivered (e.g., over a channel connection different from the VoIP channel connection) to the backend server. The backend server may relay some or all of the information received from the control panel to the central station. The backend server may store the data received from the control panel. In some examples, the backend server may transmit a message to the central station indicating that an alarm condition exists at the property being monitored by the security and/or automation system. The backend server may transmit a message to the central station indicating that a two-way call will be initiated between the control panel and the central station. In at least some examples, in response to receiving the notification that the two-way call will be made, the central station may transmit a telephone number via the backend server to the control panel for use by the control panel to initiate the two-way call. The two-way call may then be made from the control panel directly to the central station using the number received from the central station via the VoIP channel connection.

In other examples, the control panel may have stored therein (e.g., on memory of the control panel) a phone number for use in initiating the two-way call with the central station. In at least some examples, using a VoIP channel connection may facilitate a plurality of different control panels using the same telephone number for generating a two-way call with a common central station. The central station may use caller identification information from each control panel to identify the control panel and/or property. In other examples, each individual control panel may carry its own unique phone number for use in initiating the two-way call between that particular control panel and the central station.

In other embodiments, a two-way call may be initiated between the control panel and the central station based on a different type of triggering event besides an alarm condition at the property being monitored by the security and/or automation system. For example, the central station may, independent of any activity associated with the property and/or control panel, send a request via the backend server to the control panel requesting that the control panel initiate a two-way call with the central station. In one example, the central station sends such a request to the control panel after an initial two-way call between the control panel and the central station has been lost or dropped. In another example, the request from the central station to initiate a two-way call may be for testing and/or maintenance purposes and/or based on analytics or processing of data that has been conducted by the backend server and/or the central station in association with data received from the control panel or any other component or function of the security and/or automation system.

In another example, a user (e.g., homeowner) of the security and/or automation system may, via a handheld computing device, send a request that is routed through the backend server for the central station to request that the control panel initiate a two-way call with the central station. The request may be sent from the user's handheld computing device to the backend server, from the backend server to the central station, and from the central station to the control panel via the backend server. Other routing options or end scenarios are possible for providing a trigger event that leads to the control panel initiating a two-way call with the central station, such as a user to directly request via a computing device separate from the control panel that the control panel initiate a two-way call with the central station.

Another embodiment is directed to providing data transfer to and/or from a control panel concurrently with conducting a two-way call between the control panel and the central station. The data transfer may include controlling the control panel by the central station. In one example, the central station may operate to send instructions and/or controls via the backend server to control features and/or functionality of the control panel and/or other components and features of the security and/or automation system located at the property via a second connection different from a connection (e.g., VoIP channel connection) associated with the two-way call. In other examples, the data transfer may include feedback from the control panel to the central station that is sent via the backend server. The feedback data may be delivered in response to instructions and/or controls sent from the central station to the control panel via the backend server. The feedback data may be in the form of, for example, a video feed from one or more cameras located at the property, sensor data (e.g., motion sensors, door open sensors, glass break sensors, and the like), notices regarding arming and/or disarming of the security and/or automation system at the control panel, data for controlling communications from the control panel to a user and/or other third party, and/or data for controlling appliances, lighting, HVAC systems, and other security and/or automation features that may be controlled via the control panel.

The use of a broadband connection (e.g., VoIP channel connection) between the control panel, backend server, and central station may also provide improved ease of operating and controlling the control panel remotely. The VoIP channel connection may make it possible to use a single phone number for multiple control panels to call the central station because caller identification information may be delivered over the VoIP channel connection concurrently with the call being made so that the control panel can be identified. Further, the VoIP channel connection may provide advantages over typical DTMF controls when communicating from the central station back to the control panel. DTMF may have limited capability to perform a wide variety of activities and/or functions related to the control panel from the central station. Further, another connection associated with the broadband connection may be used to receive and transmit commands to the control panel during a two-way call. For example, the broadband connection may include a VoIP channel connection, video channels, data channels, command channels, etc., for use between the control panel, backend server, and central station.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 is an example of a communications system 100 in accordance with various aspects of the disclosure. In some embodiments, the communications system 100 may include one or more sensor units 110, local computing device 115, 120, network 125, server 130, control panel 135, remote computing device 140, and a central station 150. One or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 130. In alternate embodiments, the network 125 may be integrated with any one of the local computing device 115, 120, server 130, remote computing device 140, or central station 150, such that separate components are not required.

Local computing device 115, 120 and remote computing device 140 may be custom computing entities configured to interact with sensor units 110 via network 125, and in some embodiments, via server 130. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules.

Control panel 135 may be a smart home system panel, for example, an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via central station 150, remote computing device 140, server 130, and network 125.

The local computing devices 115, 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 130.

In some embodiments, the one or more sensor units 110 may be sensors configured to conduct periodic or ongoing automatic measurements related to potential trigger events at a property monitored by a security and/or automation system. Each sensor unit 110 may be capable of sensing multiple parameters, or alternatively, separate sensor units 110 may monitor separate parameters. For example, one sensor unit 110 may detect motion, while another sensor unit 110 (or, in some embodiments, the same sensor unit 110) may detect occupation of a space using infrared sensing. In some embodiments, one or more sensor units 110 may additionally monitor door and/or window operation, glass break, lock operation, unauthorized use of one or more appliances or other devices associated with the property, and/or detect smoke or fire on the property. Sensor units 110 may monitor a variety of parameters, any of which may indicate an alarm condition, such as an unauthorized access to the property, potential theft, and the like. In alternate embodiments, a user may input data directly at the local computing device 115, 120 or at remote computing device 140 that indicates or triggers an alarm condition. For example, a user may enter a distress signal into a dedicated application on his smart phone indicating the presence of a burglar, a smoke or fire condition, and the like.

Data gathered by the one or more sensor units 110 may be communicated to local computing device 115, 120, which may be, in some embodiments, a thermostat or other wall-mounted input/output smart home display. In other embodiments, local computing device 115, 120 may be a personal computer or smart phone. Where local computing device 115, 120 is a smart phone, the smart phone may have a dedicated application directed to collecting sensor data and an alarm condition therefrom. The local computing device 115, 120 may process the data received from the one or more sensor units 110 to help determine an alarm condition or other triggering event. In alternate embodiments, remote computing device 140 may process the data received from the one or more sensor units 110, via network 125 and server 130, to determine an alarm condition. Data transmission may occur via, for example, frequencies appropriate for a personal area network (such as BLUETOOTH® or IR communications) or local or wide area network frequencies such as radio frequencies specified by the IEEE 802.15.4 standard.

In some embodiments, local computing device 115, 120 may communicate with remote computing device 140 or control panel 135 via network 125 and server 130. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 130 may be configured to communicate with the sensor units 110, the local computing devices 115, 120, the remote computing device 140 and control panel 135. The server 130 may perform additional processing on signals received from the sensor units 110 or local computing devices 115, 120, or may simply forward the received information to the remote computing device 140 and control panel 135.

Server 130 may be a computing device operable to receive data streams (e.g., from sensor units 110 and/or local computing device 115, 120 or remote computing device 140), store and/or process data, and/or transmit data and/or data summaries (e.g., to remote computing device 140). For example, server 130 may receive a stream of first data from a sensor unit 110, a stream of second data from the same or a different sensor unit 110, and a stream of third data from either the same or yet another sensor unit 110. In some embodiments, server 130 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 130. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 130 may include a database (e.g., in memory) containing data received from the sensor units 110 and/or the local computing devices 115, 120. Additionally, as described in further detail herein, software (e.g., stored in memory) may be executed on a processor of the server 130. Such software (executed on the processor) may be operable to cause the server 130 to monitor, process, summarize, present, and/or send a signal associated with resource usage data.

The communications system 100 may operate to provide improved communications between control panel 135 and central station 150. The communications may be carried out over a broadband connection between the control panel 135 and central station 150. The communications may include two-way calls (e.g., two-way calls originating from control panel 135) and separate data transfer that occurs concurrently with the two-way calls. At least some of the communications (e.g., the separate data transfer) may be routed through the server 130.

The central station 150 may perform certain functions and/or controls of the control panel 135 prior to, during, and after the two-way call is established and/or terminated. This capability to control the control panel 135, or at least certain functions and/or operations of the control panel 135 remotely via, for example, the central station 150, permits personnel at the central station 150 to assist with controlling aspects of the security and/or automation system at the property while conducting the two-way call. The features of communications system 100 may provide increased functionality and the ability for the central station 150 to provide meaningful assistance, particularly during alarm conditions.

Figure 2:
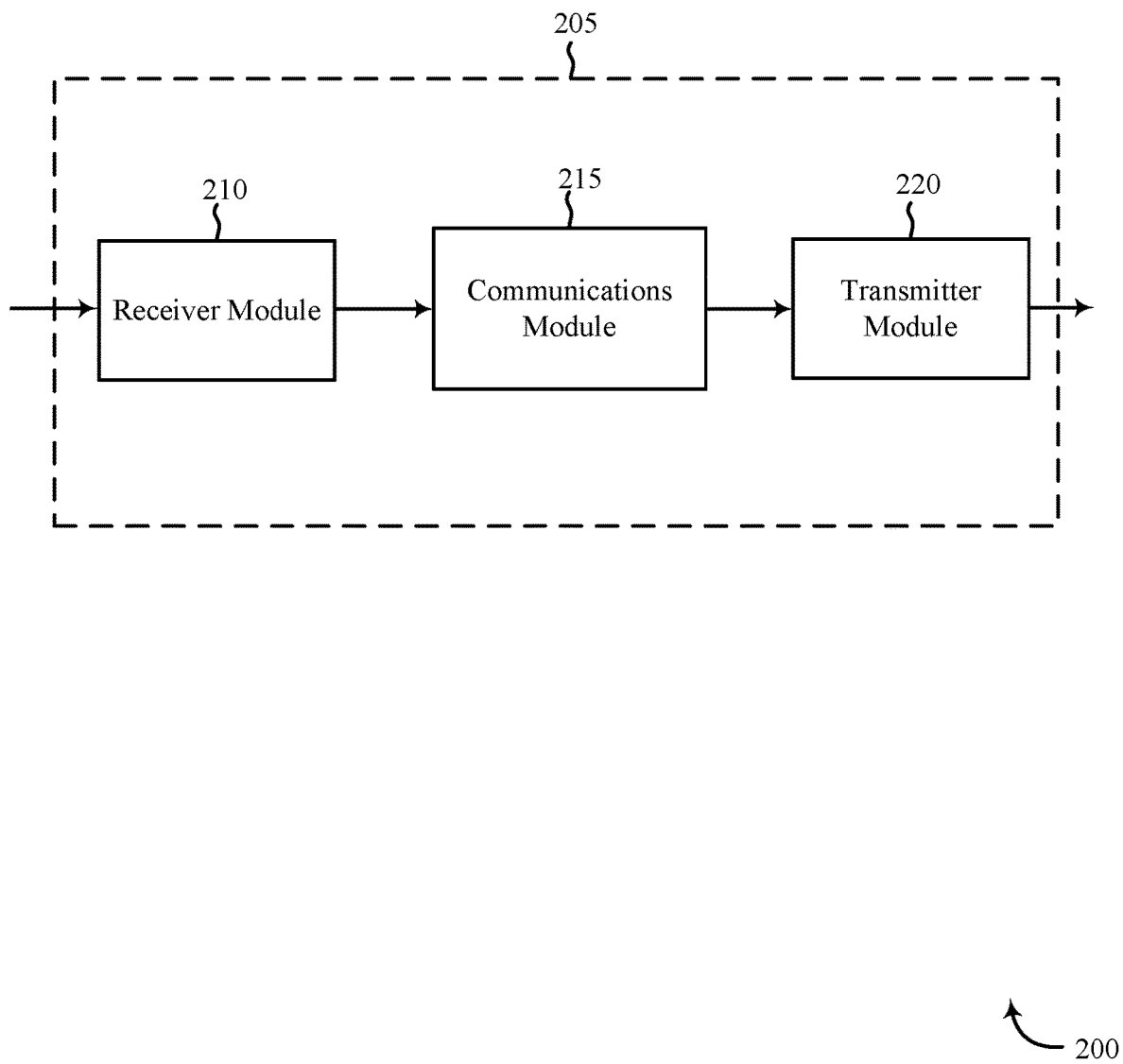
FIG. 2 shows a block diagram of a device relating to a security and/or an automation system, in accordance with various aspects of this disclosure.

FIG. 2 shows a block diagram 200 of an apparatus 205 for use in electronic communication, in accordance with various aspects of this disclosure. The apparatus 205 may be an example of one or more aspects of a control panel 135, backend server 130, and/or central station 150 described with reference to FIG. 1. The apparatus 205 may include a receiver module 210, a communications module 215, and/or a transmitter module 220. The apparatus 205 may also be or include a processor. Each of these modules may be in communication with each other—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, video channels, command channels, etc.). The receiver module 210 may be configured to receive data (e.g., sensor data), feedback, instructions, commands, and the like from a variety of sources. Information may be passed on to the communications module 215, and to other components of the apparatus 205.

The communications module 215 may operate to facilitate at least some of the functions described above associated with, for example, triggering a two-way call, initiating and conducting a two-way call, and transferring data concurrently with a two-way call, wherein the two-way call is between a control panel and a central station of a security and/or automation system. The two-way call may be conducted directly between the control panel and the central station. The data transfer may be routed at least in part between the central station and the control panel via the backend server. At least some of the data transfer may occur as part of the two-way call directly between the control panel and the central station. In at least one example, the data transfer includes controls for controlling the control panel remotely (e.g., via the central station and/or backend server). The data transfer may include a caller identification that is unique to the control panel. The phone number used for initiating the two-way call may be stored on the control panel.

The communications module 215 may operate on one or more of the control panel, backend server, and central station. In at least some examples, various sub-modules of the communications module 215 may operate independently on different ones of the control panel, backend server, and central station.

In one example, communications module 215 may operate to identify or receive information and/or data that creates a triggering event and/or prompt for initiating a two-way call between the control panel and central station. In one example, the data may be sensor data received from one or more sensors 110 located at a property (e.g., a property being monitored by a security and/or automation system and whereon the control panel resides). The sensor data may indicate an event or condition that justifies establishing a two-way call between the control panel and the central station. The event may be considered an alarm event such as, for example, unauthorized entry on the property, a fire or smoke condition, a water leak, a health emergency for one or more persons residing on the property, a malfunctioning appliance and/or system at the property, or other events that are otherwise automatically sensed and/or determined, or manually indicated by one or more persons residing at the property and/or located remote from the property (e.g., that provide input via a remote computing device).

Communications module 215 may process the data as part of determining whether the data meets threshold conditions for establishing a trigger and/or alarm event. In some examples, communications module 215 may continuously and/or periodically transmit the receipt data or other information to the backend server where the backend server stores and/or processes the data. In at least some examples, communications module 215 may operate at least in part on the backend server wherein the backend server makes a determination about whether the trigger and/or alarm event has occurred.

In other examples, the trigger event is based on information, instructions, or commands received from another device or component of the security and/or automation system, such as the central station. For example, the central station may request initiation of a two-way call from the control panel to the central station. The request may be routed through the backend server to the control panel. When the control panel receives the instructions, the instructions may be regarded as a trigger event, which then prompts initiation of the two-way call.

When a trigger event is identified, the control panel may conduct a lookup procedure to identify a telephone number for use in establishing a two-way call. The telephone number may be received from a remote location such as the central station. Alternatively, the telephone number may be stored on the backend server or the control panel itself. In one example, once the trigger event is identified, data related to the trigger event may be routed through the backend server to the central station, and the central station in response sends a telephone number via the backend server to the control panel for use in initiating the two-way call.

The two-way call may be established using various broadband or other communication channels. One example includes a Voice over Internet Protocol (VoIP) channel connection. Communications module 215 may operate to establish a two-way call between the control panel and the central station directly using a VoIP channel connection.

Communications module 215 may operate to transfer data to and/or from the control panel concurrently with the ongoing two-way call. The data transfer may occur over a second connection different from the VoIP channel connection being used for the two-way call. In some cases, the data transfer may occur over the same channel connection as that channel being used for the two-way call (e.g., over a broadband channel). A VoIP channel connection may be defined broadly to include various communication mediums, protocols, and the like, including Transmission Control Protocol (TCP) and User Datagram Protocol (UDP) for use in either or both of the two-way call and the data transfer.

The data transfer may occur concurrently with the two-way call. The data transfer may relate to the content of the two-way call. The data transfer may include controls and/or instructions for the control panel, wherein the central station remotely controls the control panel and/or components of the security and/or automation system that are controlled and/or accessible via the control panel via the second connection different from the VoIP channel connection being used for a two-way call. In one example, the data transfer includes a video stream, audio stream, motion sensor data, occupancy data, compliance operation data, and the like. In other examples, the data transfer includes a control in which the control panel is remotely controlled to turn off an audio alarm, lighting, and the like associated with the alarm condition ongoing at the property.

The transmitter module 220 may transmit the one or more signals received from other components of the apparatus 205. The transmitter module 220 may transmit data (e.g., sensor data), feedback, instructions, commands, and the like from a variety of sources. In some examples, the transmitter module 220 may be collocated with the receiver module 210 in a transceiver module.

Figure 3:
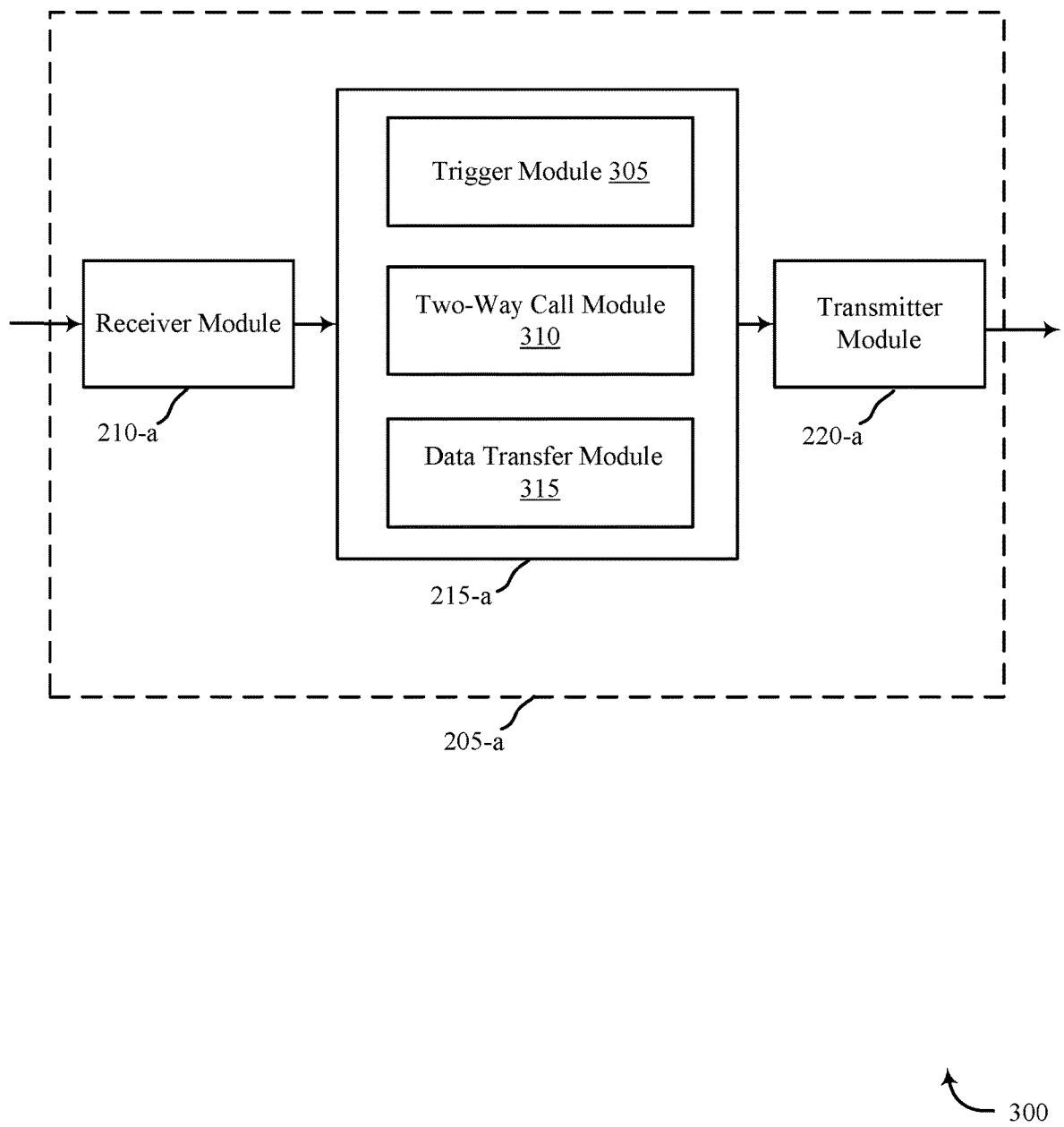
FIG. 3 shows a block diagram of a device relating to a security and/or an automation system, in accordance with various aspects of this disclosure.

FIG. 3 shows a block diagram 300 of an apparatus 205-*a* for use in wireless communication, in accordance with various examples. The apparatus 205-*a* may be an example of one or more aspects of the control panel 135, backend server 130, and/or central station 150 described with reference to FIG. 1. It may also be an example of the apparatus 205 described with reference to FIG. 2. The apparatus 205-*a* may include a receiver module 210-*a*, a communications module 215-*a*, and/or a transmitter module 220-*a*, which may be examples of the corresponding modules of apparatus 205. The apparatus 205-*a* may also include a processor. Each of these components may be in communication with each other. The communications module 215-*a* may include a trigger module 305, a two-way call module 310, and a data transfer module 315. The receiver module 210-*a* and the transmitter module 220-*a* may perform the functions of the receiver module 210 and the transmitter module 220, of FIG. 2, respectively.

The components of the apparatus 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The trigger module 305 may operate to determine a trigger event that prompts initiation of a two-way call between the control panel and the central station. Trigger module 305 may receive data, instructions, commands, feedback, and the like from any of a variety of sources for use in determining whether a threshold condition has been met. In one example, trigger module 305 may receive sensor data from one or more sensors 110 at a property being monitored by the security and/or automation system. The sensor data may be processed by trigger module 305 as part of determining whether a trigger event has occurred. In another example, trigger module 305 receives a manual input received from one or more users, such as an input entered at the control panel, an input received from a remote computing device, or the like.

In other examples, trigger module 305 receives instructions or information from the central station and/or backend server. In some examples, trigger module 305 may operate at least in part on the central station and/or backend server. In other examples, trigger module 305 operates on the control panel.

The two-way call module 310 may initiate a call between the control panel and the central station. The two-way call may be initiated by two-way call module 310 after confirmation that a trigger event has occurred. The two-way call module 310 may conduct a step of looking up a telephone number to call prior to initiating the two-way call. The telephone number may be stored at one or more of the control panel, backend server, and central station.

The two-way call module 310 may use various technologies and/or communication mediums to initiate and/or establish the two-way call. For example, the two-way call module 310 may establish the two-way call over a VoIP channel connection. The two-way call module 310 may initiate the call from the control panel. Alternatively, the two-way call may be initiated at the central station. Typically, the two-way call occurs directly between the control panel and central station.

While a VoIP connection is identified as one medium for conducting the two-way call, other mediums may be used, wherein the technology permits concurrently conducting a two-way call and transferring data over the same medium. Various types of broadband connections may facilitate such calls with concurrent data transfer.

The data transfer module 315 may operate to transfer data between at least two of the control panel, backend server, and central station. The data transfer may occur concurrently with an ongoing two-way call between the central station and control panel. In an example in which a VoIP channel connection is used for the two-way call, a second connection different from the VoIP channel connection may be used for a data transfer conducted by data transfer module 315.

The data transfer module 315 may facilitate transfer of various types of data in the form of, for example, controls, feedback, sensor data, operational data, and the like. The data transfer module 315 may facilitate data transfer directly between the control panel and the backend server, between the central station and the control panel directly and/or via the backend server, between the backend server and the central station, and other combinations thereof. Data transfer module 315 may also facilitate data transfer between a control panel and other computing devices such as, for example, a mobile computing device operated by one or more users such as a homeowner. Data transfer module 315 may facilitate data transfer between multiple devices concurrently with an ongoing two-way call between the control panel and central station. For example, data transfer module 315 may provide for controls being sent from the central station to the control panel via the backend server while concurrently providing for a video stream being sent from the control panel to a remote handheld computing device via the backend server. In this way, the data transfer module 315 may facilitate communications, controls, data transfer, and the like between the control panel and multiple parties, systems, devices, and the like, concurrently.

Figure 4:
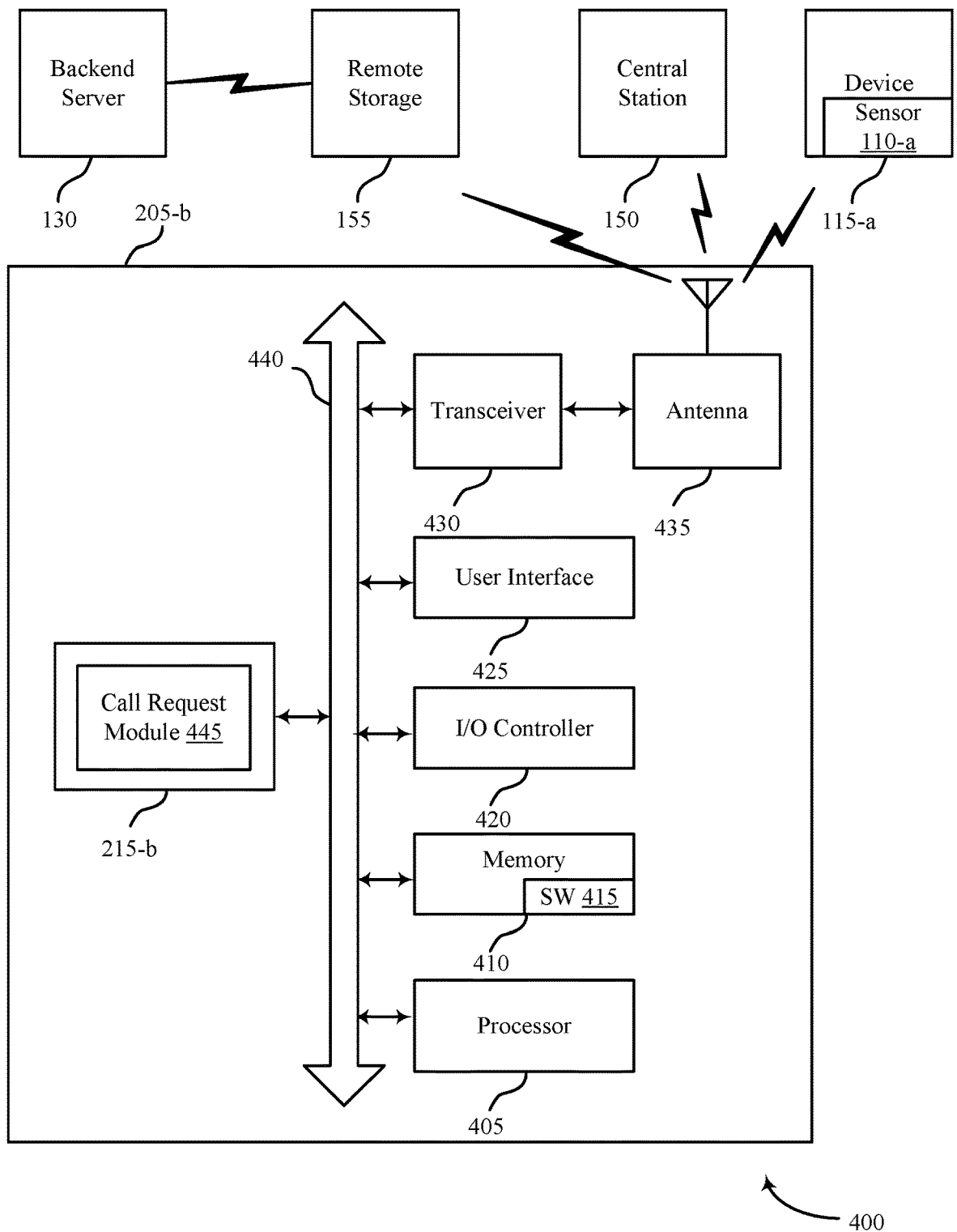
FIG. 4 shows a block diagram relating to a security and/or an automation system, in accordance with various aspects of this disclosure.

FIG. 4 shows a system 400 for use in conducting two-way calls and/or providing for control of a control panel (e.g., while concurrently conducting a two-way call) in security and/or automation systems, in accordance with various examples. System 400 may include an apparatus 205-b, which may be an example of the control panels 135, backend server 130, and/or central station 150 of FIG. 1. Apparatus 205-b may also be an example of one or more aspects of apparatuses 205 and/or 205-a of FIGS. 2 and 3.

Apparatus 205-b may include a call request module 445. Additionally, or alternatively, apparatus 205-b may include at least one of the trigger module 305, two-way call module 310, and data transfer module 315 described with reference to FIG. 3. apparatus 205-b may include other modules and components various additional embodiments.

Apparatus 205-b may also include components for bi-directional voice and data communications including components for transmitting communications and components for receiving communications. For example, apparatus 205-b may communicate bi-directionally with one or more of computing device 115-a, one or more sensors 110-a, control panel 135, remote storage 155, backend server 130 (which may be an example of the backend server 130 of FIG. 1), and/or central station 150. This bi-directional communication may be direct (e.g., apparatus 205-b communicating directly with remote storage 155) or indirect (e.g., apparatus 205-b communicating indirectly with backend server 130, such as through remote storage 155).

The call request module 445 may operate to prompt a two-way call independent of what may be considered otherwise a trigger event such as an alarm event that occurs at a property being monitored by the security and/or automation system. The call request module 445 may operate in at least some embodiments by transmitting a request from the central station to the control panel (e.g., the backend server) for the control panel to initiate a two-way call with the central station. The request from the central station to initiate the two-way call may be initiated by the call request module 445 for any number of reasons including, for example, testing, maintenance, or reestablishing a two-way call that was dropped inadvertently. The request to initiate the two-way call may include additional information such as, for example, a telephone number for use in establishing the two-way call.

In other examples, the call request module 445 may facilitate a request to establish the two-way call from a different component of the security and/or automation system such as, for example, a mobile computing device operated by a user that is remote or separate from the control panel. The request from the mobile computing device may be routed through the backend server and/or the call center. In at least some examples, the call request module 445 operates in conjunction with various security, privacy, and other standards such as, for example, a CP-01 security standard.

Apparatus 205-b may also include a processor module 405, and memory 410 (including software/firmware code (SW) 415), an input/output controller module 420, a user interface module 425, a transceiver module 430, and one or more antennas 435 each of which may communicate—directly or indirectly—with one another (e.g., via one or more buses 440). Apparatus 205-b may be one example of the backend server 130, control panel 135, and/or central station 150 described above with reference to FIG. 1. The transceiver module 430 may communicate bi-directionally—via the one or more antennas 435, wired links, and/or wireless links—with one or more networks or remote devices as described above.

For example, the transceiver module 430 may communicate bi-directionally with one or more of computing device 115-a, remote storage 155, backend server 130, and/or central station 150. The transceiver module 430 may include a modem to modulate the packets and provide the modulated packets to the one or more antennas 435 for transmission, and to demodulate packets received from the one or more antenna 435. While a control panel or a control device (e.g., apparatus 205-b) may include a single antenna 435, the control panel or the control device may also have multiple antennas 435 capable of concurrently transmitting or receiving multiple wired and/or wireless transmissions. In some embodiments, one element of apparatus 205-b (e.g., one or more antennas 435, transceiver module 430, etc.) may provide a direct connection to a backend server 130-a via a direct network link to the Internet via a POP (point of presence). In some embodiments, one element of apparatus 205-b (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 110-a (e.g., motion, proximity, smoke, light, glass break, door, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of apparatus 205-b (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., identify an alarm event, initiate a two-way call between a control panel and central station, transmit data between the control panel and central station concurrently with the ongoing two-way call, control the control panel remotely (e.g., by the central station) while the two-way call is ongoing, send a request from the central station to the control panel to initiate a two-way call, conduct the two-way call and data transfer using a Voice over Internet Protocol (VoIP) channel, etc.).

Alternatively, the software/firmware code 415 may not be directly executable by the processor module 405, but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein.

In some embodiments, the processor module 405 may include, among other things, an intelligent hardware device (e.g., a central processing unit (CPU), a microcontroller, and/or an ASIC, etc.). The memory 410 can contain, among other things, the Basic Input-Output system (BIOS) which may control basic hardware and/or software operation such as the interaction with peripheral components or devices.

For example, the call request module 445 to implement aspect of the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the apparatus 205-b may include a single antenna 435, the apparatus 205-b may have multiple antennas 435 capable of concurrently transmitting and/or receiving multiple wireless transmissions.

Figure 5:
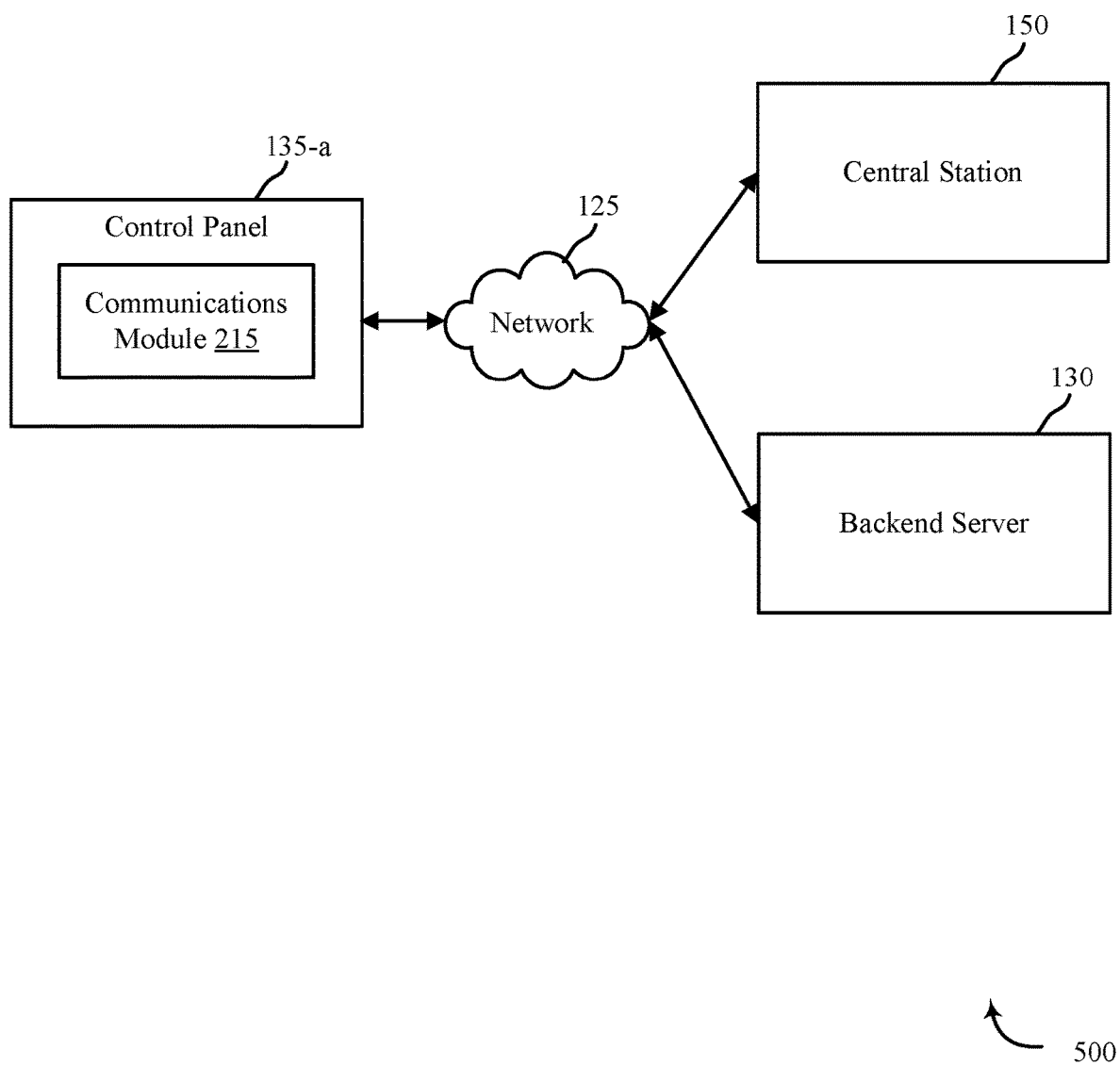
FIG. 5 shows a block diagram relating to a security and/or an automation system, in accordance with various aspects of this disclosure.

FIG. 5 is a block diagram showing a simplified version of a security and/or automation system 500. The system 500 includes control panel 135-a, a backend server 130, and a central station 150. A communications module 215 may be operated by control panel 135-a. In other examples, communications module 215, or submodules thereof, may be operated at least in part by any one or a combination of the control panel 135-a, backend server 130, and central station 150. The components of system 500 communicate with each other via network 125. In one embodiment, the components of system 500 are physically separated from each other. For example, control panel 135-a may be located at a property being monitored by system 500. Backend server 130 may include, for example, a cloud storage facility or the associate therewith. Central station 150 may be a physical location where one or more customer service representatives and various other services are available.

Figure 6:
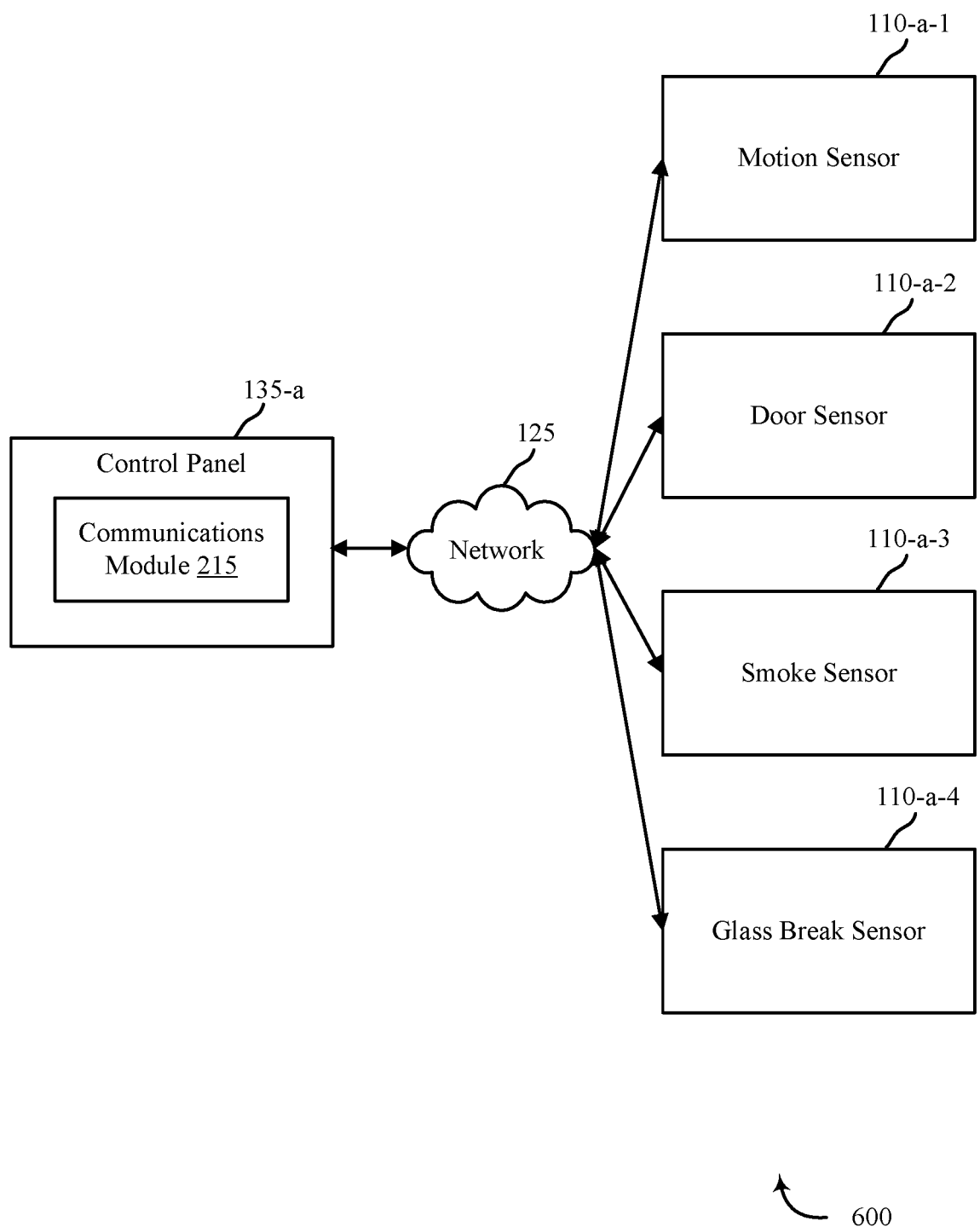
FIG. 6 shows a block diagram relating to a security and/or an automation system, in accordance with various aspects of this disclosure.

FIG. 6 is a block diagram showing a security and/or automation system 600. System 600 includes control panel 135-a that communicates with a plurality of sensors 110-a via network 125. The control panel 135-a may be an example of the control panel 135 of FIGS. 1, 4, and/or 5. The control panel 135-a may also be an example of the apparatus 205 illustrated in FIGS. 2, 3, and/or 4. The sensors 110-a may be examples of the sensors 110 of FIGS. 1 and/or 4.

The sensors include, for example, a motion sensor 110-a-1, a door sensor 110-a-2, a smoke sensor 110-a-3, and a glass break sensor 110-a-4. These and other types of sensors may provide data that is used by communications module

215 as part of determining a trigger event that leads to initiation of a two-way call between the control panel 135-a and a central station (e.g., central station 150 shown in FIG. 5). Communications module 215 may identify a trigger event using other inputs besides the data received from the sensors 110-a shown in FIG. 6 including, for example, manual inputs to control panel 135-a or feedback from other components of the security and/or automation system that are not shown in FIG. 6 (e.g., operation of appliances and the like). The sensors 110-a shown in FIG. 6 may be operated in response to commands received from the central station and/or backend server that are transmitted to control panel 135-a prior to, concurrently with, or after a two-way call between control panel 135-a and the central station.

Figure 7:
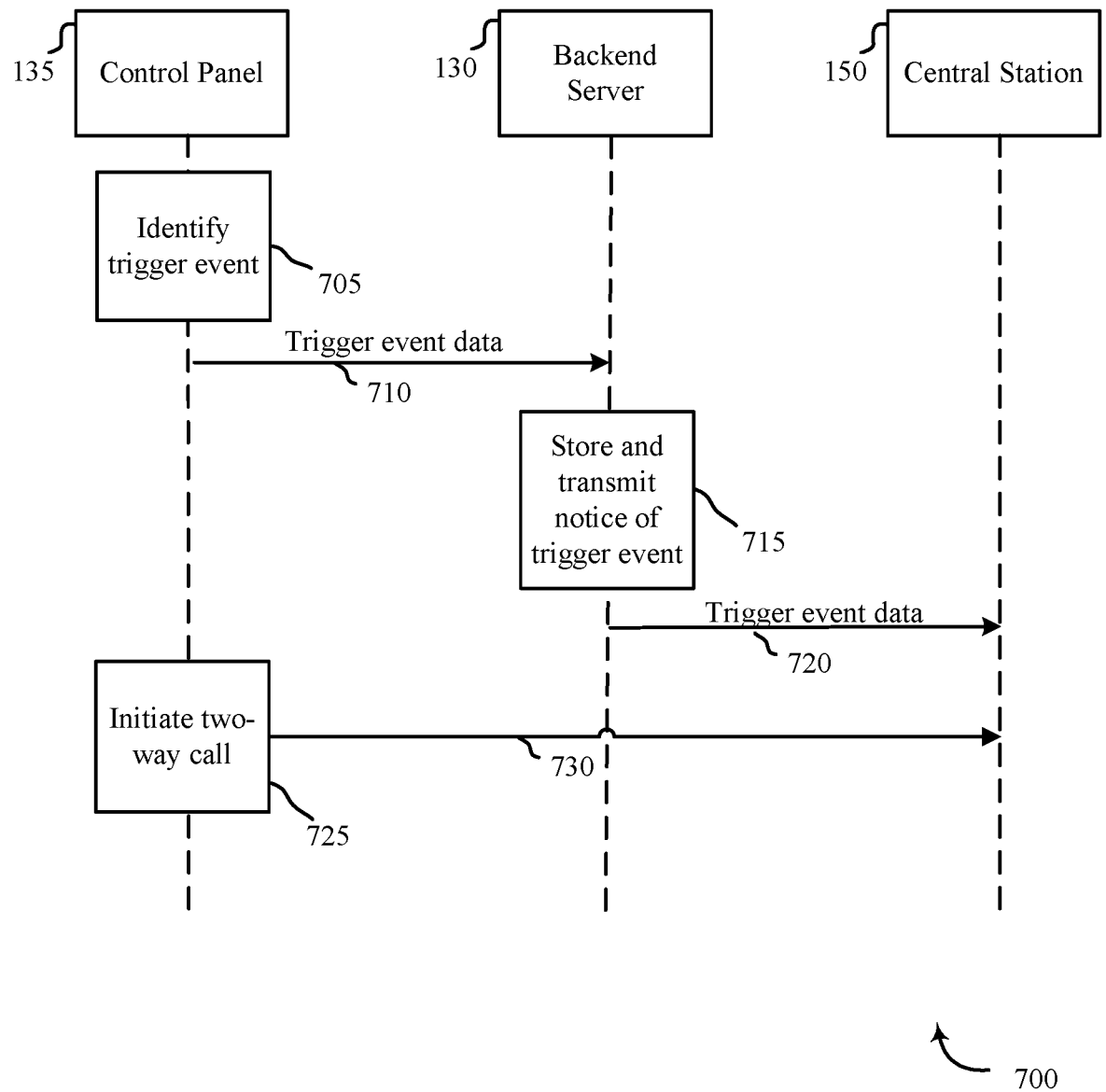
FIG. 7 shows a block diagram of an apparatus relating to a security and/or an automation system, in accordance with various aspects of this disclosure.

FIG. 7 shows a block diagram of an apparatus relating to certain functionality of a security and/or automation system 700. System 700 shows a control panel 135, a backend server 130, and a central station 150, which may be examples of the control panel 135, backend server 130, and central station 150 of FIGS. 1, 4 and 5.

In one example, the control panel 135 identifies a trigger event at block 705. Trigger event data 710 is delivered to backend server 130, which stores and transmits notice of the trigger event at block 715. Trigger event data 720 is transferred to central station 150. In at least one example, the trigger event data 720 includes a notice that the central station 150 will be receiving a two-way call from control panel 135. Prior to or after the trigger event data 720 is transferred to central station 150, control panel 135 initiates a two-way call at block 725, wherein the two-way call 730 is established directly between control panel 135 and central station 150.

In at least some examples, the two-way call 730 is conducted over a VoIP channel or medium. The two-way call 730 is typically initiated only after a trigger event is identified at block 705. The trigger event may include, for example, an alarm event as described above. The two-way call may be initiated using a telephone number that is stored at the control panel 135 or received from another source (e.g., the central station 150). The two-way call 730 may include information such as, for example, a caller ID that identifies the control panel 135.

Figure 8:
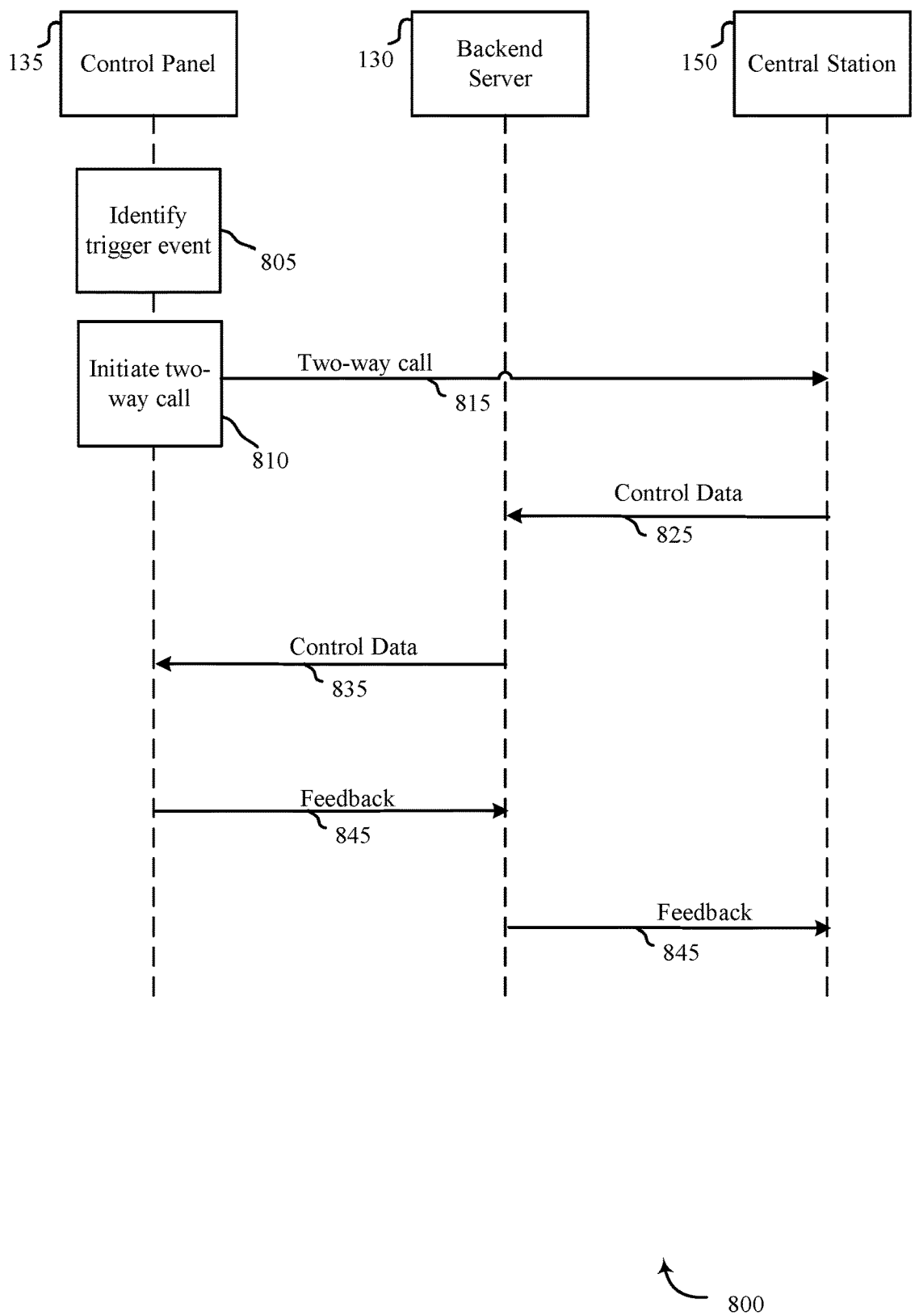
FIG. 8 shows a block diagram of an apparatus relating to a security and/or an automation system, in accordance with various aspects of this disclosure.

FIG. 8 shows a block diagram of an apparatus relating to another security and/or automation system 800. System 800 includes alternative functions associated with two-way calls and data transfer. System 800 shows a control panel 135, a backend server 130, and a central station 150, which may be examples of the control panel 135, backend server 130, and central station 150 of FIGS. 1, 4 and 5.

At block 805, the control panel 135 identifies a trigger event. Control panel 135 initiates a two-way call 815 at block 810. A two-way call 815 is established directly between control panel 135 and central station 150, for example, via a VoIP channel connection. After the two-way call 815 is established, a central station 150 may transmit control data 825 to the backend server 130, for example, via a second connection different from the VoIP channel connection. The backend server 130 transmits control data 835 to the control panel 135. The control data 835 may include, for example, instructions or controls for operating control panel 135 and/or systems or components controlled by control panel 135 (e.g., components of the security and/or automation system). Control panel 135 may transmit feedback 845 to the backend server 130 via the second connection. Backend server 130 may transmit feedback 845 to the central station 150 via the second connection. In at least one example, the feedback 845 includes, for example, sensor data, a video feed, an audio feed, an operational status for setting of the control panel 135, and the like.

Figure 9:
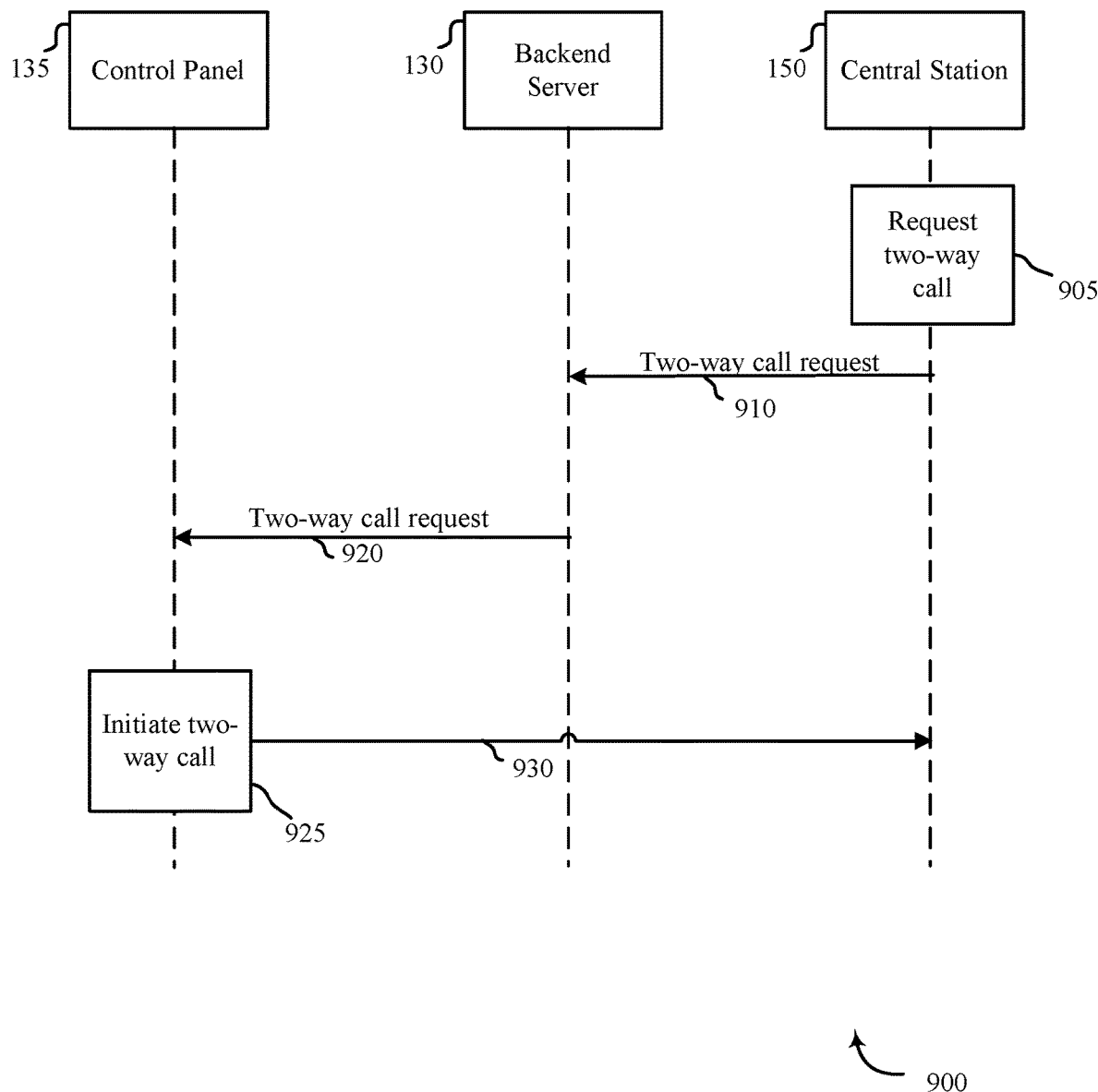
FIG. 9 shows a block diagram of an apparatus relating to a security and/or an automation system, in accordance with various aspects of this disclosure.

FIG. 9 shows the diagram of an apparatus relating to a security and/or automation system 900. FIG. 9 shows operational steps in which a two-way call is requested by central station 150. System 900 shows a control panel 135, a backend server 130, and a central station 150, which may be examples of the control panel 135, backend server 130, and central station 150 of FIGS. 1, 4 and 5.

Central station 150 requests a two-way call at block 905 in which a two-way call request 910 is sent to the backend server 130. The backend server 950 transmits a two-way call request 920 to the control panel 135. The control panel 135 then initiates a two-way call 930 at block 925. The request for a two-way call may be made by central station 150 for a variety of reasons as described above with reference to, for example, FIG. 4.

Figure 10:
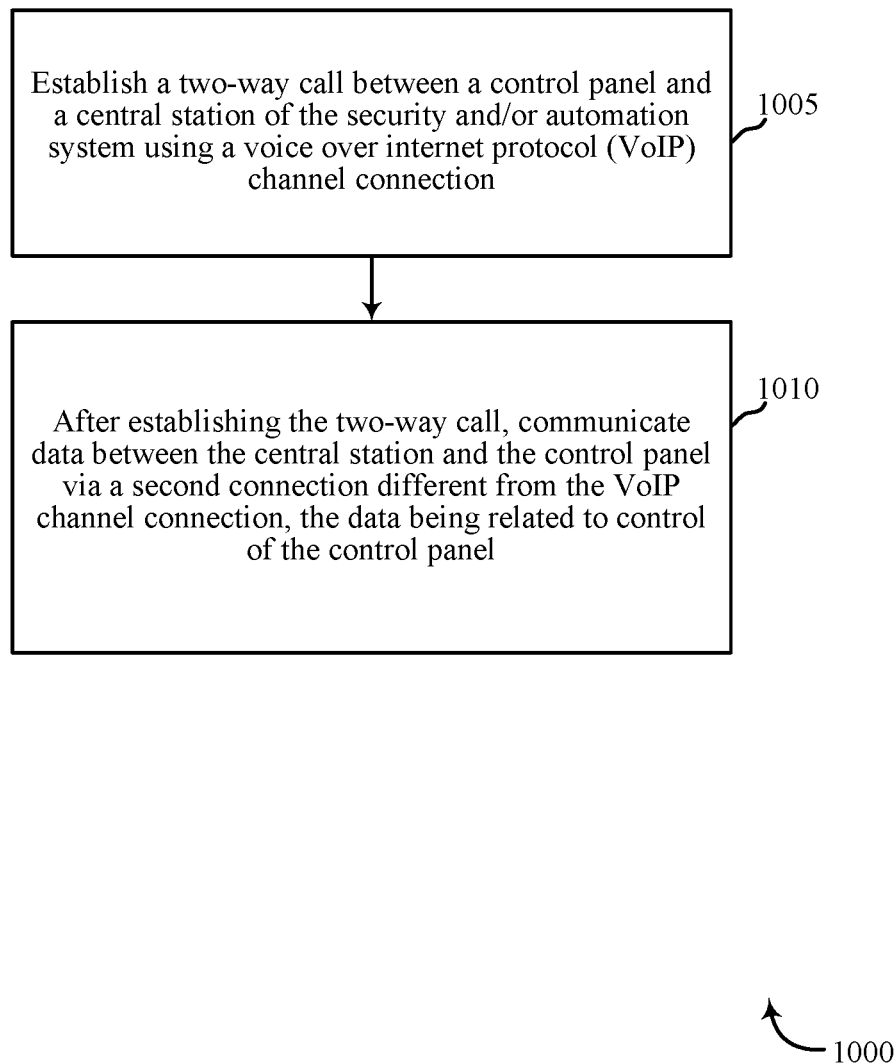
FIG. 10 is a flow chart illustrating an example of a method relating to a security and/or an automation system, in accordance with various aspects of this disclosure.

FIG. 10 is a flow chart illustrating an example of a method 1000 for communicating between components of a security and/or automation system, in accordance with various aspects of the present disclosure. For clarity, the method 1000 is described below with reference to aspects of one or more of the devices described with reference to FIGS. 1-9, and/or aspects of one or more of the modules described with reference to FIGS. 2-6. In some examples, a control panel, backend server, and/or central station may execute one or more sets of codes to control the functional elements of the control panel, backend server, and/or central station of a security and/or automation system to perform the functions described below. Additionally or alternatively, the control panel, backend server, and/or central station may perform one or more of the functions described below using special-purpose hardware.

At block 1005, the method 1000 includes establishing a two-way call between a control panel and a central station of the security and/or automation system using a Voice over Internet Protocol (VoIP) channel connection. Block 1010 includes, after establishing the two-way call, communicating data between the central station and the control panel via a central station of the security and/or automation system via a second connection different from the VoIP channel connection. The data may be related to control of the control panel. In some examples, the data may be related to control of other components and/or systems of the security and/or automation system.

The operation(s) at blocks 1005, 1010 may be performed using the communications module 215 described with reference to FIGS. 2-6. Thus, the method 1000 may provide for communicating between components of a security and/or automation system, such as conducting two-way calls using Voice over Internet Protocol (VoIP) channel and/or communicating data over a VoIP channel. The two-way call and the data transfer may occur concurrently. It should be noted that the method 1000 is just one implementation and that the operations of the method 1000 may be rearranged or otherwise modified such that other implementations are possible.

Figure 11:
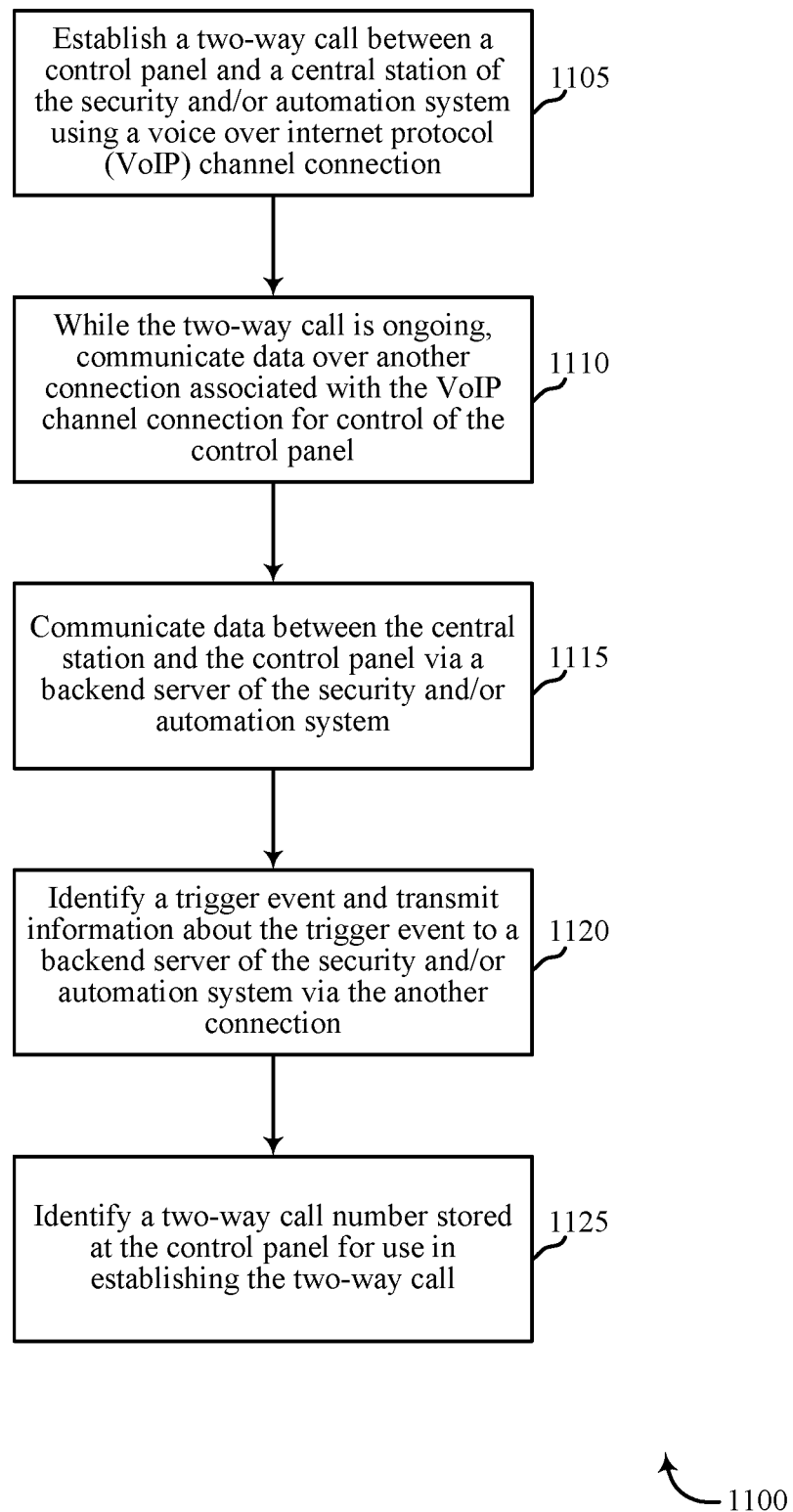
FIG. 11 is a flow chart illustrating an example of a method relating to a security and/or an automation system, in accordance with various aspects of this disclosure.

FIG. 11 is a flow chart illustrating an example of a method 1100 for communicating between components of a security and/or automation system, in accordance with various aspects of the present disclosure. For clarity, the method 1100 is described below with reference to aspects of one or more of the devices described with reference to FIGS. 1-9, and/or aspects of one or more of the modules described with reference to FIGS. 2-6. In some examples, a control panel, backend server, and/or central station may execute one or more sets of codes to control the functional elements of the control panel, backend server, and/or central station of a security and/or automation system to perform the functions described below. Additionally or alternatively, the control panel, backend server, and/or central station may perform one or more of the functions described below using special-purpose hardware.

At block 1105, the method 1100 includes establishing a two-way call between a control panel and a central station of a security and/or automation system using a Voice over Internet Protocol (VoIP) channel connection. Block 1110 includes communicating data over another connection associated with the VoIP channel connection for control of the control panel while the two-way call is ongoing. Block 1115 includes communicating data between the central station and the control panel via the backend server of the security and/or automation system. Block 1120 includes identifying a trigger event and transmitting information about the trigger event to the backend server of the security and/or automation system via the another connection prior to establishing the two-way call. Block 1125 includes identifying a two-way call number stored at the control panel for use in establishing the two-way call.

The operation(s) at blocks 1105-1125 may be performed using the communications module 215 described with reference to FIGS. 2-6. Thus, the method 1100 may provide for communicating between components of a security and/or automation system, such as conducting two-way calls using a Voice over Internet Protocol (VoIP) channel and/or communicating data over a VoIP channel. The two-way call and the data transfer may occur concurrently. It should be noted that the method 1100 is just one implementation and that the operations of the method 1100 may be rearranged or otherwise modified such that other implementations are possible.

Figure 12:
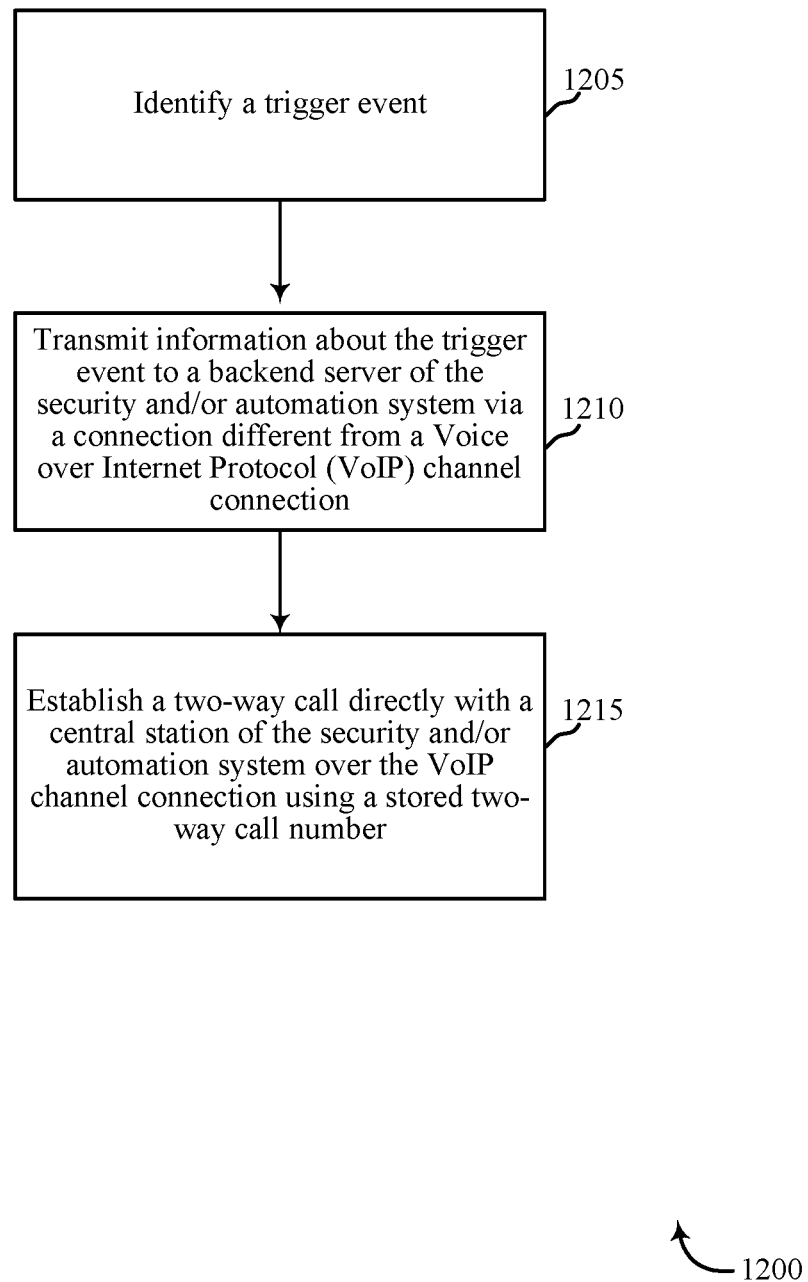
FIG. 12 is a flow chart illustrating an example of a method relating to a security and/or an automation system, in accordance with various aspects of this disclosure.

FIG. 12 is a flow chart illustrating an example of a method 1200 for communicating between components of a security and/or automation system, in accordance with various aspects of the present disclosure. For clarity, the method 1200 is described below with reference to aspects of one or more of the devices described with reference to FIGS. 1-9, and/or aspects of one or more of the modules described with reference to FIGS. 2-6. In some examples, a control panel, backend server, and/or central station may execute one or more sets of codes to control the functional elements of the control panel, backend server, and/or central station of a security and/or automation system to perform the functions described below. Additionally or alternatively, the control panel, backend server, and/or central station may perform one or more of the functions described below using special-purpose hardware.

Block 1205 of method 1200 includes identifying a trigger event. Block 1210 includes transmitting information about the trigger event to a backend server of the security and/or automation system via a connection different from a VoIP channel connection. Block 1215 includes establishing a two-way call directly with a central station of the security and/or automation system over the VoIP channel connection using a stored two-way call number.

The operation(s) at blocks 1205-1215 may be performed using the communications module 215 described with reference to FIGS. 2-6. Thus, the method 1200 may provide for communicating between components of a security and/or automation system, such as conducting two-way calls using a Voice over Internet Protocol (VoIP) channel and/or communicating data over a VoIP channel. The two-way call and the data transfer may occur concurrently. It should be noted that the method 1200 is just one implementation and that the operations of the method 1200 may be rearranged or otherwise modified such that other implementations are possible.

In some examples, aspects from two or more of the methods 1000, 1100, 1200 may be combined and/or separated. It should be noted that the methods 1000, 1100, 1200 are just example implementations, and that the operations of the methods 1000, 1100, 1200 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for a security and/or automation system, comprising:
   identifying, at a control panel of the security and/or automation system, one or more trigger events, the one or more trigger events comprising receiving, from a central station of the security and/or automation system via a backend server, a request for the control panel to initiate a two-way call with the central station, wherein receiving the request is based at least in part on determining that a previous two-way call between the between the control panel and the central station failed;
   initiating, based at least in part on identifying the one or more trigger events, the two-way call directly between the control panel and the central station of the security and/or automation system over a voice over internet protocol (VoIP) channel connection, wherein the two-way call is initiated using a telephone number received from the central station of the security and/or automation system via the backend server of the security and/or automation system using a second connection that is different than the VoIP channel connection; and
   receiving, concurrently with the two-way call, data from the central station of the security and/or automation system via the backend server of the security and/or automation system using the second connection, wherein the data from the central station comprises one or more instructions from the central station, the one or more instructions controlling at least one appliance, at least one light, a heating ventilation and air conditioning (HVAC) system, an alarm, or a combination thereof, at a premises monitored by the security and/or automation system.

2. The method of claim 1, further comprising:
   transmitting, over the second connection and concurrently with the two-way call, feedback data in response to the one or more instructions.

3. The method of claim 2, wherein the feedback data comprises a video feed from one or more cameras located at the premises monitored by the security and/or automation system, sensor data, a notice of an arming status of the security and/or automation system, data for controlling one or more components of the security and/or automation system, or a combination thereof.

4. The method of claim 1, further comprising:
transmitting, based at least in part on identifying the one or more trigger events, information related to the one or more trigger events to the central station via the backend server over the second connection.

5. The method of claim 4, wherein the information related to the one or more trigger events further comprises an indication that the central station will receive the two-way call from the control panel.

6. The method of claim 1, further comprising:
transmitting, to the central station via the backend server over the second connection, concurrently with the two-way call, caller identification information associated with the control panel.

7. The method of claim 1, further comprising:
identifying, based at least in part on identifying the one or more trigger events and performing a lookup function, the telephone number received from the central station, wherein initiating the two-way call is based at least in part on identifying the telephone number received from the central station.

8. The method of claim 1, wherein the one or more trigger events comprises a detected alarm condition at a premises being monitored by the security and/or automation system.

9. The method of claim 1, further comprising:
providing a video feed to a handheld computing device via the backend server, concurrently with the two-way call over the VoIP channel connection.

10. The method of claim 1, wherein the second connection comprises a coaxial cable, an optical fiber, a twisted pair, a digital subscriber line (DSL), a local telephone network, a cellular network, or a wireless broadband connection, or a combination thereof.

11. An apparatus for communicating between components of a security and/or automation system, comprising:
a processor;
memory in electronic communication with the processor; and
instructions stored in the memory, the instructions being executable by the processor to:
identify, at a control panel of a of the security and/or automation system, one or more trigger events, the one or more trigger events comprising receiving, from a central station of the security and/or automation system via a backend server, a request for the control panel to initiate a two-way call with the central station, wherein receiving the request is based at least in part on determining that a previous two-way call between the between the control panel and the central station failed;
initiate, based at least in part on identifying the one or more trigger events, the two-way call directly between the control panel and the central station over a voice over internet protocol (VoIP) channel connection, wherein the two-way call is initiated using a telephone number received from the central station of the security and/or automation system via the backend server of the security and/or automation system using a second connection that is different than the VoIP channel connection; and
receive, concurrently with the two-way call, data from the central station of the security and/or automation system via the backend server of the security and/or automation system using the second connection, wherein the data from the central station comprises one or more instructions from the central station, the one or more instructions controlling at least one appliance, at least one light, a heating ventilation and air conditioning (HVAC) system, an alarm, or a combination thereof, at a premises monitored by the security and/or automation system.

12. The apparatus of claim 11, wherein the instructions are further executable by the processor to:
transmit, over the second connection and concurrently with the two-way call, feedback data based at least in part on the one or more instructions.

13. A non-transitory computer-readable medium storing instructions executable by a processor to:
identify, at a control panel of a security and/or automation system, one or more trigger events, the one or more trigger events comprising receiving, from a central station of the security and/or automation system via a backend server, a request for the control panel to initiate a two-way call with the central station, wherein receiving the request is based at least in part on determining that a previous two-way call between the between the control panel and the central station failed;
initiate, based at least in part on identifying the one or more trigger events, the two-way call directly between the control panel and the central station over a voice over internet protocol (VoIP) channel connection, wherein the two-way call is initiated using a telephone number received from the central station of the security and/or automation system via the backend server of the security and/or automation system using a second connection that is different than the VoIP channel connection; and
receive, concurrently with the two-way call, data from the central station of the security and/or automation system via the backend server of the security and/or automation system using the second connection, wherein the data from the central station comprises one or more instructions from the central station, the one or more instructions controlling at least one appliance, at least one light, a heating ventilation and air conditioning (HVAC) system, an alarm, or a combination thereof, at a premises monitored by the security and/or automation system.

* * * * *